United States Patent
Wan et al.

(10) Patent No.: US 10,961,394 B2
(45) Date of Patent: Mar. 30, 2021

(54) THERMOPLASTIC COMPOSITION, METHOD FOR THE MANUFACTURE THEREOF, AND ARTICLES PREPARED THEREFROM

(71) Applicant: SABIC Global Technologies B.V, Bergen op Zoom (NL)

(72) Inventors: Chen Wan, Newburgh, IN (US); Hao Zhou, Newburgh, IN (US); Raghavendra Raj Maddikeri, Newburgh, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 119 days.

(21) Appl. No.: 16/301,601

(22) PCT Filed: May 11, 2017

(86) PCT No.: PCT/US2017/032089
§ 371 (c)(1),
(2) Date: Nov. 14, 2018

(87) PCT Pub. No.: WO2017/200829
PCT Pub. Date: Nov. 23, 2017

(65) Prior Publication Data
US 2019/0194459 A1    Jun. 27, 2019

Related U.S. Application Data (60) Provisional application No. 62/336,973, filed on May 16, 2016.

(51) Int. Cl.
| | | |
|---|---|---|
| *C08L 83/10* | (2006.01) | |
| *C08L 69/00* | (2006.01) | |
| *C08L 79/08* | (2006.01) | |
| *C08J 3/20* | (2006.01) | |
| *C08L 51/04* | (2006.01) | |
| *C08L 55/02* | (2006.01) | |
| *C08G 77/448* | (2006.01) | |
| *C08L 25/12* | (2006.01) | |

(52) U.S. Cl.
CPC .............. *C08L 83/10* (2013.01); *C08J 3/201* (2013.01); *C08L 69/005* (2013.01); *C08L 79/08* (2013.01); *C08G 77/448* (2013.01); *C08L 25/12* (2013.01); *C08L 51/04* (2013.01); *C08L 55/02* (2013.01); *C08L 2203/20* (2013.01); *C08L 2205/02* (2013.01); *C08L 2205/035* (2013.01); *C08L 2205/06* (2013.01)

(58) Field of Classification Search
CPC .... C08G 73/1071; C08G 77/448; C08J 3/201; C08L 25/12; C08L 51/04; C08L 53/025; C08L 55/02; C08L 69/005; C08L 79/08; C08L 83/10; C08L 2203/20; C08L 2205/02; C08L 2205/035; C08L 2205/06; C08L 2207/53
See application file for complete search history.

(56) References Cited

U.S. PATENT DOCUMENTS

| | | |
|---|---|---|
| 3,130,177 A | 4/1964 | Grabowski et al. |
| 6,723,864 B2 | 4/2004 | Silva et al. |
| 2004/0039145 A1 | 2/2004 | Silva et al. |
| 2005/0009970 A1 | 1/2005 | Seidel et al. |
| 2005/0256246 A1* | 11/2005 | Van Hartingsveldt ....... C08L 69/00 524/494 |
| 2012/0214929 A1* | 8/2012 | Fishburn ................. C08L 71/12 524/445 |
| 2014/0179843 A1 | 6/2014 | Van Der Mee et al. |
| 2014/0295363 A1 | 10/2014 | Sun et al. |

FOREIGN PATENT DOCUMENTS

| | | |
|---|---|---|
| CN | 101619162 A | 1/2010 |
| WO | 2013175448 A1 | 11/2013 |
| WO | 2014072923 A1 | 5/2014 |
| WO | 2015106204 | 7/2015 |

OTHER PUBLICATIONS

International Search Report for International Application No. PCT/US2017/032089; International Filing Date: May 11, 2017; dated Aug. 7, 2017; 6 pages.
Written Opinion for International Application No. PCT/US2017/032089; International Filing Date: May 11, 2017; dated Aug. 7, 2017; 6 pages.

* cited by examiner

*Primary Examiner* — Christopher M Rodd
(74) *Attorney, Agent, or Firm* — Cantor Colburn LLP (57) ABSTRACT

A thermoplastic composition includes a poly(etherimide), a poly(ester-carbonate), a poly(carbonate-siloxane), a flow promoter, and a hydrogenated block copolymer of an alkenyl aromatic compound and a conjugated diene. The flow promoter includes units derived from styrene and acrylonitrile, preferably an acrylonitrile-butadiene-styrene, a styrene-acrylonitrile, a high rubber graft acrylonitrile-styrene-acrylate copolymer, or a combination including at least one of the foregoing. A method of making the thermoplastic composition and an article including the thermoplastic composition are also disclosed.

19 Claims, 1 Drawing Sheet

THERMOPLASTIC COMPOSITION, METHOD FOR THE MANUFACTURE THEREOF, AND ARTICLES PREPARED THEREFROM

CROSS-REFERENCE TO RELATED APPLICATIONS

This application is a National Stage application of PCT/US2017/032089, filed May 11, 2017, which claims the benefit of U.S. Provisional Application No. 62/336,973 filed May 16, 2016, both of which are incorporated by reference herein in their entirety.

BACKGROUND

Polyimides, especially poly(etherimide)s (PEI), are high performance polymers having high strength, heat resistance, and modulus, and broad chemical resistance. Poly(etherimide)s are widely used in applications including automotive, telecommunications, aerospace, electrical/electronics, transportation, food service, and healthcare. For certain applications, including consumer electronics, there are strict critical-to-quality requirements that a composition should meet in order to find use in such applications. For example, high impact strength, good chemical resistance, and processability can be a particularly desirable combination of properties.

Some thermoplastic compositions of interest including poly(etherimide) can provide the desired impact strength and chemical resistance, however known formulations tend to exhibit high viscosity, which can be problematic during processing and subsequent molding. Thus, providing a thermoplastic composition for use in consumer electronics applications that exhibits the preferred combination of properties has been difficult.

Accordingly, there remains a continuing need in the art for a thermoplastic composition that can simultaneously meet all of the desired requirements and overcome the above-described technical limitations. For example, a composition exhibiting high impact strength, good chemical resistance, and good processability would be particularly desirable.

BRIEF DESCRIPTION

A thermoplastic composition comprises 10 to 30 wt % of a poly(etherimide); 5 to 15 wt % of a poly(ester-carbonate); 30 to 55 wt % of a poly(carbonate-siloxane); 5 to 25 wt % of a flow promoter comprising units derived from styrene and acrylonitrile, preferably an acrylonitrile-butadiene-styrene, a styrene-acrylonitrile, a high rubber graft acrylonitrile-styrene-acrylate copolymer, or a combination comprising at least one of the foregoing; and 1 to 5 wt % of a hydrogenated block copolymer of an alkenyl aromatic compound and a conjugated diene; wherein the weight percent of each component is based on the total weight of the composition.

A method of making the thermoplastic composition comprises melt-mixing the components of the composition; and optionally, extruding the composition.

An article comprises the thermoplastic composition, or the thermoplastic composition made by the method.

The above described and other features are exemplified by the following FIGURE and detailed description.

BRIEF DESCRIPTION OF THE DRAWINGS

The following FIGURE is an exemplary embodiment.

DETAILED DESCRIPTION

Figure 1:
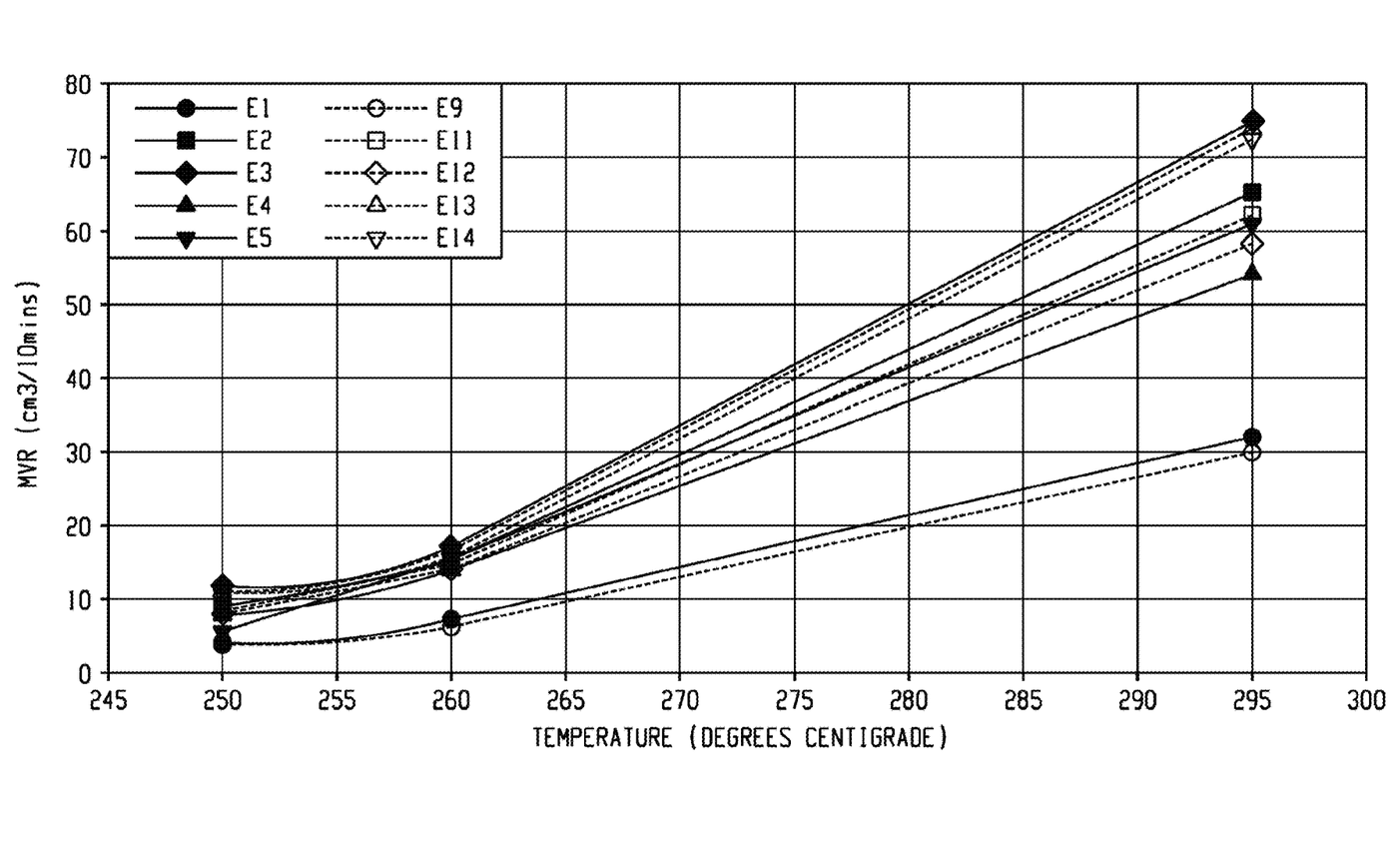
The FIGURE shows the melt volume-flow rate plotted versus temperature for various examples described herein.

The present inventors have unexpectedly discovered a thermoplastic composition that exhibits the desired property balance between impact performance and melt flow properties. The thermoplastic composition includes a particular amount of a flow promoter comprising repeating units derived from styrene and acrylonitrile. Advantageously, the compositions of the present disclosure exhibit improved flow while maintaining good impact resistance. The compositions also exhibited good chemical resistance. Thus, the compositions of the present disclosure are suitable for use in a variety of applications where a balance of physical properties is desired, for example, in consumer electronics and components thereof.

Accordingly, one aspect of the present disclosure is a thermoplastic composition. The thermoplastic composition comprises a poly(etherimide). Poly(etherimide)s comprise more than 1, for example 2 to 1000, or 5 to 500, or 10 to 100 structural units of formula (1)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (2)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and Z is a divalent group of formula (3a). Alternatively, R is m-phenylene, p-phenylene, or a combination comprising at least one of the foregoing, and Z is a divalent group of formula (3a) and Q is 2,2-isopropylidene. Alternatively, the poly(etherimide) can be a copolymer comprising additional structural poly(etherimide) units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a moiety derived from bisphenol A.

In some embodiments, the poly(etherimide) can be a copolymer that optionally comprises additional structural imide units that are not poly(etherimide) units, for example imide units of formula (4)

a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z is a divalent group of formula (3a)

wherein Q$^1$ is —O—, —S—, —C(O)—, —SO$_2$—, —SO—, —P(R$^a$)(=O)— wherein R$^a$ is a C$_{1-8}$ alkyl or C$_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent of the R groups contain sulfone groups, and in other embodiments no R groups contain sulfone groups.

Further in formula (1), the divalent bonds of the —O—Z—O— group are in the 3,3', 3,4', 4,3', or the 4,4' positions, and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing, provided that the valence of Z is not exceeded. Exemplary groups Z include groups of formula (3)

wherein R is as described in formula (1) and each V is the same or different, and is a substituted or unsubstituted C$_{6-20}$ aromatic hydrocarbon group, for example a tetravalent linker of the formulas wherein R$^a$ and R$^b$ are each independently the same or different, and are a halogen atom or a monovalent C$_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each C$_6$ arylene group are disposed ortho, meta, or para (preferably para) to each other on the C$_6$ arylene group. The bridging group X$^a$ can be wherein W is a single bond, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the poly(etherimide).

The poly(etherimide) can be prepared by any of the methods known to those skilled in the art, including the reaction of an aromatic bis(ether anhydride) of formula (5) or a chemical equivalent thereof, with an organic diamine of formula (6)

(5)

H$_2$N—R—NH$_2$ (6)

wherein Z and R are defined as described above. Copolymers of the poly(etherimide)s can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. C$_{1-4}$ alkylated or poly(C$_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The poly(etherimide)s can have a melt index of 0.1 to 10 grams per minute (g/min), as measured by American Society for Testing Materials (ASTM) D1238 at 340 to 370° C., using a 6.7 kilogram (kg) weight. In some embodiments, the poly(etherimide) has a weight average molecular weight (Mw) of 1,000 to 150,000 grams/mole (Dalton, Da), as measured by gel permeation chromatography, using polystyrene standards. In some embodiments the poly(etherimide) has an Mw of 10,000 to 80,000 Da. Such poly(etherimide)s typically have an intrinsic viscosity greater than 0.2 deciliters per gram (dl/g), or, more 0.35 to 0.7 dl/g as measured in m-cresol at 25° C.

The poly(etherimide) can be present in the composition in an amount of 10 to 30 weight percent (wt %), or 15 to 21 wt %, based on the total weight of the composition.

In addition to the poly(etherimide), the composition comprises a poly(ester-carbonate). Poly(ester-carbonates) include repeating carbonate units of formula (7)

(7)

wherein at least 60 percent of the total number of R$^1$ groups are aromatic, or each R$^1$ contains at least one C$_{6-30}$ aromatic group. Specifically, each R$^1$ can be derived from a dihydroxy compound such as an aromatic dihydroxy compound of formula (8) or a bisphenol of formula (9).

(98)

(9)

In formula (8), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (9), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, preferably methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

Poly(ester-carbonate)s further contain, in addition to recurring carbonate chain units of formula (7), repeating ester units of formula (10)

(10)

wherein J is a divalent group derived from a dihydroxy compound (which includes a reactive derivative thereof), and can be, for example, a $C_2$-10 alkylene, a $C_{6-20}$ cycloalkylene a $C_{6-20}$ arylene, or a polyoxyalkylene group in which the alkylene groups contain 2 to 6 carbon atoms, 2, 3, or 4 carbon atoms; and T is a divalent group derived from a dicarboxylic acid (which includes a reactive derivative thereof), and can be, for example, a $C_2$-20 alkylene, a $C_{6-20}$ cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (8) (e.g., resorcinol), bisphenols of formula (9) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), preferably linear $C_8$-12 aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-proplyene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example from 1:99 to 99:1, or 10:90 to 90:10, or 25:75 to 75:25, or 2:98 to 15:85. In some embodiments the molar ratio of ester units to carbonate units in the poly(ester-carbonate)s can vary from 1:99 to 30:70, or 2:98 to 25:75, or 3:97 to 20:80, or 5:95 to 15:85.

In some embodiments, the poly(ester-carbonate) is a poly(ester-carbonate-siloxane), for example comprising bisphenol A carbonate units, isophthalate-terephthalate-bisphenol A ester units, and siloxane units, for example blocks containing 5 to 200 dimethylsiloxane units, or 5 to 30 or 10 to 60 siloxane units, such as those commercially available under the trade name FST from SABIC.

The poly(ester-carbonate) can be present in an amount of 5 to 15 wt %, or 8 to 12 wt %, based on the total weight of the composition.

In addition to the poly(etherimide) and the poly(ester-carbonate), the composition comprises a poly(carbonate-siloxane). The poly(carbonate-siloxane) includes repeating carbonate units according to formula (7) as described above, and further comprises polysiloxane units, such as polydimethylsiloxane units. The siloxane units can be as in formula (11)

(11)

wherein each R' is independently a $C_{1-13}$ monovalent hydrocarbyl group. For example, each R' can independently be a $C_{1-13}$ alkyl group, $C_{1-13}$ alkoxy group, $C_2$-13 alkenyl group, $C_2$-13 alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R' groups can be used in the same copolymer. In an embodiment, the polysiloxane blocks comprise R' groups that have minimal hydrocarbon content. In a specific embodiment, an R' group with a minimal hydrocarbon content is a methyl group, and the polysiloxane units are polydimethylsiloxane units.

The value of E in formula (11) can vary widely depending on the type and relative amount of each component in the thermoplastic composition, the desired properties of the composition, and like considerations. Generally, E has an average value of 2 to 1,000, or 2 to 500, 2 to 200, or 2 to 125, 5 to 80, or 10 to 70. In an embodiment, E has an average value of 10 to 80 or 10 to 40, and in still another embodiment, E has an average value of 40 to 80, or 40 to 70. Where E is of a lower value, e.g., less than 40, it can be desirable to use a relatively larger amount of the poly(carbonate-siloxane) copolymer. Conversely, where E is of a higher value, e.g., greater than 40, a relatively lower amount of the poly(carbonate-siloxane) copolymer can be used.

The poly(carbonate-siloxane) copolymers can comprise 50 to 99 wt % of carbonate units and 1 to 50 wt % siloxane units. Within this range, the poly(carbonate-siloxane) can comprise 70 to 98 wt %, or 75 to 97 wt % of carbonate units and 2 to 30 wt %, or 3 to 25 wt % siloxane units.

In an embodiment, the poly(carbonate-siloxane) copolymer comprises bisphenol A carbonate units and siloxane units, for example blocks containing 5 to 200 dimethylsiloxane units, such as those commercially available under the trade name EXL from SABIC.

In some embodiments, the poly(carbonate-siloxane) is a transparent poly(carbonate-siloxane), for example comprising carbonate units (7) derived from bisphenol A, and repeating siloxane units (11), wherein E has an average value of 4 to 50, 4 to 15, preferably 5 to 15, or 6 to 15, or 7 to 10. The transparent copolymers can be manufactured using one or both of the tube reactor processes described in U.S. Patent Application No. 2004/0039145A1 or the process described in U.S. Pat. No. 6,723,864 can be used to synthesize the poly(carbonate-siloxane) copolymers.

In an embodiment, the poly(carbonate-siloxane) copolymer comprises 10 wt % or less, preferably 6 wt % or less, or 4 wt % or less, of the polysiloxane based on the total weight of the poly(carbonate-siloxane) copolymer, and are generally optically transparent and are commercially available under the name EXL-T from SABIC.

Poly(carbonate-siloxane)s can have an Mw of 2,000 to 100,000 Da, or 5,000 to 50,000 Da as measured by gel permeation chromatography using a crosslinked styrene-divinyl benzene column, at a sample concentration of 1 milligram per milliliter, and as calibrated with polycarbonate standards.

The poly(carbonate-siloxane)s can have a melt volume flow rate, measured at 300° C./1.2 kg, of 1 to 50 cubic centimeters per 10 minutes (cc/10 min), or 2 to 30 cc/10 min. Mixtures of poly(carbonate-siloxane)s of different flow properties can be used to achieve the overall desired flow property.

The poly(carbonate-siloxane) can be present in the composition in an amount of 30 to 55 wt %, or 35 to 50 wt %, based on the total weight of the thermoplastic composition.

The thermoplastic composition further includes a flow promoter. The flow promoter comprises units derived from styrene and acrylonitrile. In some embodiments, the flow promoter is an acrylonitrile-butadiene-styrene, a styrene-acrylonitrile, a high rubber graft (HRG) acrylonitrile-styrene-acrylate copolymer, or a combination comprising at least one of the foregoing.

In some embodiments, the flow promoter comprises an acrylonitrile-butadiene-styrene copolymer (ABS). As used herein, the term "acrylonitrile-butadiene-styrene copolymer" refers to an acrylonitrile-butadiene-styrene terpolymer or a blend of styrene-butadiene rubber and styrene-acrylonitrile copolymer. In some embodiments, the flow promoter comprises an acrylonitrile-butadiene-styrene graft copolymer.

ABS graft copolymers include two or more polymers of different compositions, which are bonded chemically, to form the graft copolymer structure. The graft copolymer can be prepared by first polymerizing a conjugated diene, such as butadiene or another conjugated diene with a monomer copolymerizable therewith, such as styrene, to provide a polymeric backbone. After formation of the polymeric backbone, at least one grafting monomer, and preferably two grafting monomers, are polymerized in the presence of the polymer backbone to obtain the graft copolymer. These polymers are prepared by methods that are known in the art.

The backbone polymer, as mentioned, is preferably a conjugated diene polymer such as polybutadiene, polyisoprene, or a copolymer, such as butadiene-styrene, butadiene-acrylonitrile, or the like. Conjugated diene monomers that can be utilized in preparing the backbone of the graft copolymer are of formula (12)

wherein $X^b$ is independently at each occurrence hydrogen, a substituted or unsubstituted $C_1$-$C_5$ alkyl, chlorine, bromine, or the like. Examples of dienes that can be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro- and bromo-substituted butadienes such as dichlorobutadiene, bromobutadiene, dibromobutadiene, and the like, or a combination comprising at least one of the foregoing dienes. In some embodiments, the conjugated diene is butadiene.

Monomers that can be polymerized in the presence of the polymer backbone can include monovinylaromatic monomers containing condensed aromatic ring structures, such as vinyl naphthalene, vinyl anthracene, and the like, or monomers of formula (13)

wherein each $X^c$ is independently hydrogen, $C_1$-$C_{12}$ alkyl, $C_3$-$C_{12}$ cycloalkyl, $C_6$-$C_{12}$ aryl, $C_7$-$C_{12}$ aralkyl, $C_{7-12}$ alkylaryl, $C_{1-12}$ alkoxy, $C_{3-12}$ cycloalkoxy, $C_{6-12}$ aryloxy, chloro, bromo, or hydroxy, and R is hydrogen, $C_{1-5}$ alkyl, bromo, or chloro. Examples of the monovinylaromatic compounds that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. In some embodiments, the monovinylaromatic hydrocarbon monomer is styrene.

Other monomers that can be polymerized in the presence of the polymer backbone include monovinylic monomers such as itaconic acid, acrylamide, N-substituted acrylamide or methacrylamide, maleic anhydride, maleimide, N-alkyl-, aryl-, or haloaryl-substituted maleimide, glycidyl (meth) acrylates, and monomers of formula (14)

wherein R is hydrogen, $C_{1-5}$ alkyl, bromo, or chloro, and $X^d$ is cyano, $C_{1-12}$ alkoxycarbonyl, $C_{1-12}$ aryloxycarbonyl, hydroxy carbonyl, or the like. Examples of monomers of formula (14) include acrylonitrile, methacrylonitrile, alpha-chloroacrylonitrile, beta-chloroacrylonitrile, alpha-bromo-acrylonitrile, acrylic acid, methyl (meth)acrylate, ethyl (meth)acrylate, n-butyl (meth)acrylate, t-butyl (meth)acrylate, n-propyl (meth)acrylate, isopropyl (meth)acrylate, 2-ethylhexyl (meth)acrylate, and the like, and combinations comprising at least one of the foregoing monomers. Monomers such as n-butyl acrylate, ethyl acrylate, and 2-ethylhexyl acrylate are commonly used as monomers copolymerizable with the conjugated diene monomer. In some embodiments, acrylonitrile is preferred. Combinations of the foregoing monovinylic monomers and monovinylaromatic monomers can also be used.

In the preparation of the graft copolymer, the conjugated diene portion of the polymer comprises 50 wt % of the total graft polymer composition. The monomers polymerized in the presence of the backbone, exemplified by styrene and acrylonitrile, comprise 40 to 95% by weight of the total graft polymer composition.

Without wishing to be bound by theory, it is believed that when ABS is used as the flow promoter, the thermoplastic composition can advantageously exhibit improved impact properties and flow properties due to the presence of the styrene-acrylonitrile copolymer and the rubber phase. Thus, in some embodiments, when ABS is used as the flow promoter, no additional impact modifier is required.

In some embodiments, the flow promoter comprises a styrene-acrylonitrile copolymer (SAN). The styrene-acrylonitrile copolymer can be prepared according to methods that are known. In some embodiments, the styrene-acrylonitrile copolymer can have a weight ratio of 10:90 to 90:10, or 25:75 to 75:25, or 50:50.

In some embodiments, the flow promoter comprises a high rubber graft acrylonitrile-styrene-acrylate (ASA HRG) copolymer. In some embodiments, the flow promoter comprises both the above-described styrene-acrylonitrile copolymer and the high rubber graft acrylonitrile-styrene-acrylate copolymer. In some embodiments, the high rubber graft acrylonitrile-styrene-acrylate is a high rubber graft acrylonitrile-styrene-butyl acrylate copolymer. The acrylonitrile and styrene repeating units present in the ASA HRG can be present in a weight ratio of 1:1 to 5:1, preferably 2:1. The acrylonitrile-styrene copolymer can be grafted onto an acrylate rubber, preferably a butyl acrylate rubber, for example in the form of rubber particles. In some embodiments, the acrylonitrile-styrene copolymer portion of the ASA HRG can be 40 to 60 wt %, preferably 50 to 60 wt %, more preferably 55 wt %, based on the total weight of the ASA HRG. The butyl acrylate rubber can be in an amount of 40 to 60 wt %, preferably 40 to 50 wt %, more preferably 45 wt %, based on the total weight of the ASA HRG.

Without wishing to be bound by theory, it is believed that when ASA HRG is used as a flow promoter component, the thermoplastic composition can advantageously exhibit improved impact properties and flow properties due to the presence of the styrene-acrylonitrile copolymer and the rubber phase, similar to when ABS is used, as described above. Thus, in some embodiments, when ASA HRG is included as a flow promoter, no additional impact modifier is required.

The flow promoter can be present in an amount of 5 to 25 wt %, or 10 to 20 wt %, based on the total weight of the composition. In some embodiments, the flow promoter comprises the acrylonitrile-butadiene-styrene graft copolymer in an amount of 15 to 20 wt %, or 16 to 18 wt %, based on the total weight of the thermoplastic composition. In some embodiments, the flow promoter comprises the styrene-acrylonitrile copolymer in an amount of 10 to 15 wt %, or 10 to 13 wt %, based on the total weight of the thermoplastic composition.

The thermoplastic composition further comprises a hydrogenated block copolymer of an alkenyl aromatic compound, for example a compound of formula (13) and a conjugated diene, for example a compound of formula (12). The hydrogenated block copolymer can comprise 10 to 90 wt % of poly(alkenyl aromatic) content and 90 to 10 wt % of poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 wt %, or 20 to 35 wt %, or 25 to 35 wt %, or 30 to 35 wt %, all based on the weight of the low poly(alkenyl aromatic) content hydrogenated block copolymer. In other embodiments, the hydrogenated block copolymer is a high poly(alkenyl aromatic) content hydrogenated block copolymer in which the poly(alkenyl aromatic) content is 40 to 90 wt %, or 50 to 80 wt %, or 60 to 70 wt %, all based on the weight of the high poly(alkenyl aromatic) content hydrogenated block copolymer.

In some embodiments, the hydrogenated block copolymer has an Mw of 40,000 to 400,000 Da. The number average molecular weight and the weight average molecular weight can be determined by gel permeation chromatography and based on comparison to polystyrene standards. In some embodiments, the hydrogenated block copolymer has an Mw of 200,000 to 400,000 Da, or 220,000 to 350,000 Da. In other embodiments, the hydrogenated block copolymer has an Mw of 40,000 to about 200,000 Da, or 40,000 to 180,000 Da, or 40,000 to 150,000 Da.

The alkenyl aromatic monomer used to prepare the hydrogenated block copolymer can be of formula (15)

wherein $R^2$ and $R^3$ each independently represent a hydrogen atom, a substituted or unsubstituted $C_{1-8}$ alkyl group, or a substituted or unsubstituted $C_{2-8}$ alkenyl group; $R^4$ and $R^8$ each independently represent a hydrogen atom, a substituted or unsubstituted $C_{1-8}$ alkyl group, a chlorine atom, or a bromine atom; and $R^5$, $R^6$, and $R^7$ each independently represent a hydrogen atom, a substituted or unsubstituted $C_{1-8}$ alkyl group, or a substituted or unsubstituted $C_{2-8}$ alkenyl group, or $R^5$ and $R^6$ are taken together with the central aromatic ring to form a naphthyl group, or $R^6$ and $R^7$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_{4-20}$ conjugated diene, for example a conjugated diene of formula (12). Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and combinations comprising at least one of the foregoing. In some embodiments, the conjugated diene is 1,3-butadiene, 2-methyl-1,3-butadiene, or a combination comprising at least one of the foregoing. In some embodiments, the conjugated diene is 1,3-butadiene. The conjugated diene block is at least partially reduced by hydrogenation to provide the hydrogenated block copolymer. In some embodiments, the conjugated diene portion of the block copolymer is at least 50% hydrogenated, or at least 70% hydrogenated, or at least 90% hydrogenated.

The hydrogenated block copolymer is a copolymer comprising (A) at least one block derived from an alkenyl aromatic compound and (B) at least one block derived from a conjugated diene. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the unhydrogenated block copolymer is a diblock copolymer, a triblock copolymer, or a combination comprising at least one of the foregoing.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms.

In some embodiments, the hydrogenated block copolymer comprises a polystyrene-polybutadiene-polystyrene triblock copolymer. In some embodiments, the hydrogenated block copolymer comprises a poly(styrene-(ethylene-butylene)-styrene) triblock copolymer having an Mw of 10,000 to 100,000 Dalton. In some embodiments, the poly(styrene-(ethylene-butylene)-styrene) triblock copolymer has a polystyrene content of 40 to 70 wt %, based on the total weight of the triblock copolymer.

The hydrogenated block copolymer can be present in an amount of 1 to 5 wt %, or 2.5 to 3.5 wt %, based on the total weight of the composition.

In some embodiments, the thermoplastic composition further comprises an impact modifier. Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising (i) an elastomeric (i.e., rubbery) polymer substrate having a Tg less than 10° C., or less than −10° C., or −40 to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene or styrene; or combinations comprising at least one of the foregoing elastomers. materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, preferably methyl methacrylate.

In some embodiments, the impact modifier can include an acrylate rubber, preferably an acrylic core-shell impact modifier. Such impact modifiers generally comprise a crosslinked polymer core and a grafted polymer shell, for example a crosslinked butyl acrylate core with a grafted methyl methacrylate shell. Exemplary core components are poly($C_{1-12}$ alkyl acrylate) or a poly($C_{1-12}$ alkyl methacrylate) such as polymers made from methyl acrylate, ethyl acrylate, n-propyl acrylate, n-butyl acrylate, tert-butyl acrylate, 2-ethylhexyl acrylate and the corresponding methacrylate polymers. Most preferred is poly (n-butyl methacrylate) as core material. Preferred shell-material polymers include methyl acrylate, ethyl acrylate, n-propyl acrylate, n-butyl acrylate, tert-butyl acrylate, 2-ethylhexyl acrylate. Most preferred is poly(methyl acrylate). Acrylic core-shell impact modifiers suitable for use in the present thermoplastic compositions include those available from Dow Chemical Co., under the tradename PARALOID.

When present, the impact modifier can be included in the composition in an amount of 3 to 15 wt %, or 5 to 12 wt %, or 5 to 10 wt %, or 6 to 8 wt %, based on the total weight of the composition.

In some embodiments, the thermoplastic composition can optionally further include an additive composition. The additive composition can include one or more additives selected to achieve a desired property, with the proviso that the one or more additives are also selected so as to not significantly adversely affect a desired property of the thermoplastic composition. The additive composition or individual additives can be mixed at a suitable time during the mixing of the components for forming the composition. The additive composition can include a filler, reinforcing agent, antioxidant, heat stabilizer, light stabilizer, ultraviolet light stabilizer, ultraviolet light absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing. In general, the additives are used in the amounts generally known to be effective. For example, the total amount of the additives (other than any impact modifier, filler, or reinforcing agents) can be 0.01 to 5 wt %, based on the total weight of the thermoplastic composition.

In some embodiments, the thermoplastic composition can include light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 5 wt %, 0.1 to 2.5 wt %, or 0.15 to 2 wt %, based on the total weight of the composition.

In some embodiments, the thermoplastic composition can include antioxidant additives including organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants.

In an embodiment, the thermoplastic composition comprises 15 to 21 wt % of a poly(etherimide); 8 to 12 wt % of a poly(ester-carbonate-siloxane); 35 to 50 wt % of a transparent poly(carbonate-siloxane)comprising less than 10 wt % siloxane units, based on the total weight of the poly (carbonate-siloxane); 10 to 20 wt % of an acrylonitrile-butadiene-styrene graft copolymer, a styrene-acrylonitrile copolymer, or a combination comprising at least one of the foregoing; and 2.5 to 3.5 wt % of a poly(styrene-(ethylene-butylene)-styrene) triblock copolymer; wherein the weight percent of each component is based on the total weight of the composition. In an embodiment, the thermoplastic composition further includes 5 to 10 wt % of an impact modifier and 5 to 15 wt % of an additive composition.

The thermoplastic composition can be prepared by melt-mixing or a combination of dry-blending and melt-mixing the above-described components. Melt-mixing can be performed in single or twin screw type extruders or similar mixing devices which can apply a shear and heat to the components. Melt-mixing can be performed at temperatures greater than or equal to the melting temperatures of the polymer components and less than the degradation temperatures of either of the polymer components.

All of the ingredients can be added initially to the processing system. In some embodiments, the ingredients can be added sequentially or through the use of one or more master batches. It can be advantageous to apply a vacuum to the melt through one or more vent ports in the extruder to remove volatile impurities in the composition. In some embodiments, the composition is the product of melt-mixing the polymers, flow promoters, and, when present, any additives or impact modifiers.

The thermoplastic composition can have a desirable combination of properties.

The thermoplastic composition can have a tensile modulus of greater than or equal to 2000 MPa, preferably 2000 to 2500 MPa, more preferably 2200 to 2400 MPa, determined according to ASTM D638.

The thermoplastic composition can have a melt volume-flow rate of greater than or equal to 40 $cm^3$/10 minutes, preferably 40 to 100 $cm^3$/10 minutes, more preferably 50 to 80 $cm^3$/10 minutes, even more preferably 50 to 65 $cm^3$/10 minutes, determined according to ASTM D1238 at 295° C. under a 6.7 kilogram load.

The thermoplastic composition can have a notched Izod impact strength of greater than or equal to 100 J/m, preferably 150 to 850 J/m, more preferably 200 to 650 J/m, even more preferably 350 to 550 J/m, determined according to ASTM D256 at 23° C. using a 5 lb-f hammer on 75×12.5× 3.2 millimeter injection molded bars.

The thermoplastic composition can have a heat deflection temperature of greater than or equal to 100° C., preferably 105 to 125° C., more preferably 105 to 115° C., even more preferably 109 to 112° C., determined according to ASTM D648.

A molded sample of the thermoplastic composition does not exhibit cracking during tensile testing at 1% strain after being immersed in a chemical reagent comprising sunscreen for a period of 72 hours at a temperature of 65° C. or for a period of 120 hours at a temperature of 23° C. In some embodiments, the chemical reagent comprises sunscreen.

In some embodiments, the thermoplastic composition exhibits at least one of the above-described properties, or at least two of the above-described properties, or at least three of the above-described properties. In some embodiments, the thermoplastic composition exhibits each of the above-described properties.

The thermoplastic compositions described herein can also be useful for the manufacture of various articles. The articles can be prepared by any suitable method including injection molding, extrusion, compression molding, and the like, or a combination comprising at least one of the foregoing. The thermoplastic composition can be particularly useful for electronics applications due to the advantageous combination of properties. For example, in some embodiments, an article comprising the thermoplastic composition can be an electronic device or a component of an electronic device. In some embodiments, the electronic device or component thereof can be an antenna, an antenna housing, a computer, a monitor, a hand-held electronic device, a cellular telephone, a smart telephone, a laptop computer, a notebook computer, a tablet computer, a television, a smart board, or a wearable electronic device (e.g., smart watch, activity tracker, health tracker, health monitoring devices, and the like).

The thermoplastic compositions provided herein demonstrate a desirable combination of physical properties, in particular a balance between impact strength and melt flow for processability. Therefore, a substantial improvement in thermoplastic compositions, particularly for use in electronics applications, is provided.

The compositions, methods, and articles, are further illustrated by the following examples, which are non-limiting.

EXAMPLES

Materials for the following examples are listed in Table 1.

TABLE 1

| Component | Description | Supplier |
|---|---|---|
| PEI-1 | Poly(etherimide) comprising structural units derived from phenylene diamine and BPA-dianhydride, available as ULTEM 1010 | SABIC |
| PEI-2 | Poly(etherimide) comprising structural units derived from phenylene diamine and BPA-dianhydride, available as ULTEM C8500 | SABIC |
| PCE | Poly(ester-carbonate) comprising bisphenol A carbonate units, isophthalate-terephthalate-bisphenol A ester units, and siloxane ester units, available under the trade name LEXAN FST | SABIC |
| PC-Si | Transparent poly(carbonate-siloxane) copolymer comprising bisphenol A carbonate units and siloxane units, available under the trade name LEXAN EXL-T | SABIC |
| SAN-1 | High flow bulk SAN having a styrene:acrylonitrile weight ratio of 75:25, available as SAN C29355 | SABIC |
| SAN-2 | SAN having a styrene:acrylonitrile weight ratio of 75:25, available under the trade name CYCOLAC INP581 | SABIC |
| ABS | Acrylonitrile-butadiene-styrene copolymer having a butadiene content of 16%, manufactured through continuous bulk polymerization process | SABIC |
| ASA HRG | Acrylonitrile-styrene (2:1 wt/wt) grafted onto butyl acrylate rubber particles having 55% acrylonitrile-styrene, and 45% butyl acrylate rubber | SABIC |
| IM | Acrylic impact modifier as PARALOID EXL-2335 | Dow Chemical |
| SEBS | Poly(styrene-(ethylene-butadiene)-styrene) block copolymer available as SEPTON 8104 | Kuraray Co. Ltd. |
| LS Phosphite | Light stabilizer available as CYASORB UV-3638 Antioxidant stabilizer | Cytec |
| AO | Hindered phenolic antioxidant stabilizer | |
| TiO$_2$ | Titanium Oxide, CAS Reg. No. 1317-70-0 | Du Pont |

The compositions of the following examples were prepared by compounding on a 27 millimeter twin screw extruder, and chopped into pellets following cooling in a water bath at 20-30° C. Articles suitable for physical testing were prepared by injection molding. Prior to injection molding, the obtained pellets were dried in an oven. All articles were tested "as molded," with no additional annealing step.

Physical testing of the compositions was conducted according to the following test methods and procedures. Unless indicated otherwise, all test standards refer to the tests in effect in the year 2008-2013.

Bars were injection molded for ASTM tensile, heat distortion temperature (HDT), and flame testing using an 80-ton van Dorn molding machine with a set temperature of 285-310° C. The compounded pellets were dried for 3-4 hours at 120° C. in a forced air-circulating oven prior to injection molding.

Melt volume-flow rate (MVR) was tested at various conditions according to ASTM D1238 standards for full comparison. The testing conditions used were: 295° C. under a 6.7 kilogram load; 260° C. under a 6.7 kilogram load; 250° C. under a 6.7 kilogram load; and 250° C. under a 2.16 kilogram load.

Specific gravity of the compositions was measured according to ASTM D792.

Notched and un-notched Izod testing was performed on 75×12.5×3.2 millimeter injection molded bars according to ASTM method D256 at 23° C. using a 5 lb-f hammer for notched specimens.

Tensile properties were measured according to ASTM D638 at 23° C. and 50 millimeter per minute speed.

Heat deflection temperature (HDT) was determined according to ASTM D648 with 1.8 megapascal stress on 3.2 millimeter-thick specimens.

The chemical resistance of the compositions was tested using sunscreen (trade name BANANA BOAT). The aging conditions tested were 65° C. for 72 hours and room temperature (23° C.) for 120 hours. Tensile bars (end-gated) were molded according to the molding procedure described above. The bars were oven dried, wiped clean, and allowed to air dry prior to tensile testing. Three bars were placed into a 1% strain jig for the desired time (selected depending on temperature, as stated above). The tensile property retention for each composition is reported in terms of a percent difference relative to the results of an unexposed control sample. Each data point is the average of three samples measured under the same conditions.

For each of Examples 1-14, the polymer components and any additives were melt-mixed in the amounts shown in Table 2, extruded, and characterized as described above. Physical testing results are also shown in Table 2.

| | Units | E1* | E2 | E3 | E4 | E5 | E6 | E7 |
|---|---|---|---|---|---|---|---|---|
| Component | | | | | | | | |
| PEI-1 | % | 20.6 | 20.6 | 20.6 | 17.5 | 17.5 | 15.5 | 15.5 |
| PEI-2 | % | | | | | | | |
| PCE | % | 11 | 11 | 11 | 9.4 | 9.4 | 8.3 | 8.3 |
| PC-Si | % | 48.3 | 36.3 | 36.3 | 43.2 | 43.2 | 43.8 | 43.8 |
| SAN-1 | % | | 12.2 | 12.2 | | 10 | 12.5 | 12.5 |
| SAN-2 | % | | | | | | | |
| ABS | % | | | | 17 | | | |
| ASA HRG | % | | | 7 | | | | 7 |
| IM | % | 7 | 7 | | | 7 | 7 | |
| SEBS | % | 3 | 2.8 | 2.8 | 2.8 | 2.8 | 2.8 | 2.8 |

-continued

| | | | | | | | | |
|---|---|---|---|---|---|---|---|---|
| LS | % | 2 | 2 | 2 | 2 | 2 | 2 | 2 |
| Phosphite | % | 0.1 | 0.1 | 0.1 | 0.1 | 0.1 | 0.1 | 0.1 |
| AO | % | 0.05 | 0.05 | 0.05 | 0.05 | 0.05 | 0.05 | 0.05 |
| $TiO_2$ | % | 7.95 | 7.95 | 7.95 | 7.95 | 7.95 | 7.95 | 7.95 |
| Properties | | | | | | | | |
| Tensile Modulus | MPa | 2202 | 2352 | 2394 | 2324 | 2254 | 2280 | 2358 |
| $MVR^1$ | $cm^3/10$ min | 0.745 | 1.56 | 1.59 | 1.53 | 1.3 | 1.96 | 2.16 |
| $MVR^2$ | $cm^3/10$ min | 4.16 | 8.88 | 9.31 | 8.15 | 5.62 | 11.1 | 12.8 |
| $MVR^3$ | $cm^3/10$ min | 7.09 | 15.1 | 15.9 | 13.8 | 15 | 19.2 | 2.3 |
| $MVR^4$ | $cm^3/10$ min | 32.1 | 65 | 74.2 | 54.1 | 61.1 | 74.5 | 87.7 |
| NII | J/m | 840 | 546 | 47.9 | 395 | 374 | 156 | 113 |
| HDT | ° C. | 120.1 | 112 | 109.8 | 109.8 | 110.6 | 108.3 | 108.5 |

| | Units | E8 | E9* | E10 | E11 | E12 | E13 | E14 |
|---|---|---|---|---|---|---|---|---|
| Component | | | | | | | | |
| PEI-1 | % | 15.5 | 20.6 | 20.6 | 17.5 | 17.5 | 15.5 | |
| PEI-2 | % | | | | | | | 17.5 |
| PCE | % | 8.3 | 11 | 11 | 9.4 | 9.4 | 8.3 | 9.4 |
| PC-Si | % | 41.3 | 48.3 | 36.3 | 43.2 | 43.2 | 44.8 | 43.2 |
| SAN-1 | % | | | 12.2 | | 10 | 11.5 | 10 |
| SAN-2 | % | 15 | | | | | | |
| ABS | % | | | | 17 | | | |
| ASA HRG | % | | | | | | | |
| IM | % | 7 | 7 | 7 | | 7 | 7 | 7 |
| SEBS | % | 2.8 | 3 | 2.8 | 2.8 | 2.8 | 2.8 | 2.8 |
| LS | % | 2 | 2 | 2 | 2 | 2 | 2 | 2 |
| Phosphite | % | 0.1 | 0.1 | 0.1 | 0.1 | 0.1 | 0.1 | 0.1 |
| AO | % | 0.05 | 0.05 | 0.05 | 0.05 | 0.05 | 0.05 | 0.05 |
| $TiO_2$ | % | 7.95 | 7.95 | 7.95 | 7.95 | 7.95 | 7.95 | 7.95 |
| Properties | | | | | | | | |
| Tensile Modulus | MPa | 2286 | 2134 | 2272.5 | 2260 | 2228 | 2212 | 2220 |
| $MVR^1$ | $cm^3/10$ min | 1.77 | 0.45 | 1.34 | 1.51 | 1.4 | 1.83 | 1.79 |
| $MVR^2$ | $cm^3/10$ min | 10.6 | 3.63 | 8.27 | 8.58 | 8.01 | 10.1 | 9.76 |
| $MVR^3$ | $cm^3/10$ min | 17.7 | 6.09 | 14.4 | 14 | 14.2 | 16.9 | 16.3 |
| $MVR^4$ | $cm^3/10$ min | 69 | 30.1 | 64.4 | 59.8 | 58.2 | 74 | 72.3 |
| NII | J/m | 254 | 817 | 94.1 | 356 | 220 | 169 | 192 |
| HDT | ° C. | 107.7 | 120.9 | 111.7 | 110.3 | 111.6 | 108.7 | 110.5 |

*Comparative Example
[1]250° C. under a 2.16 kilogram load;
[2]250° C. under a 6.7 kilogram load;
[3]260° C. under a 6.7 kilogram load;
[4]295° C. under a 6.7 kilogram load The compositions of Examples 1 and 9 in Table 2 comprise PEI, PCE, PC-Si, and SEBS. These compositions exhibit a notched Izod impact strength of 840 and 817 J/m, respectively, and a HDT of 120.1 and 120.9° C., respectively, and thus can meet the requirements for impact strength and ability to withstand secondary processing at temperatures of 100° C. for a given period of time. However, as can be seen in Table 2, the compositions of Examples 1 and 9 have poor flow, exhibited by the MVR values determined at various temperatures and under varying loads.

As shown in Examples 2-8 and 10-14 in Table 2, ABS and SAN can be introduced into the compositions as flow promoters. As shown in Table 2, the introduction of ABS or SAN leads to greatly improved flow properties of the compositions. Furthermore, each composition exhibits a HDT of greater than 100° C., suggesting that such compositions could withstand secondary processing at a temperature of 100° C. In particular, Examples 2, 4, 5, and 11 each demonstrate compositions that exhibit an improved balance of impact strength and flow. Specifically, each of Examples 2, 4, 5, and 11 exhibited the combination of a tensile modulus of 2200 to 2400 MPa, a MVR at 295° C. under a 6.7 kg load of 50 to 65 $cm^3/10$ minutes, a notched Izod impact strength of 350 to 550 J/m, and a HDT of 109 to 112° C.

The FIGURE shows the improvement in processability of the compositions of Examples 2-5 and 11-14 relative to the comparative compositions of Examples 1 and 9. As shown in the FIGURE, MVR of each composition is plotted against temperature.

The chemical resistance of the compositions of various Examples was assessed using sunscreen on select compositions, according to the method described above. The compositions tested and the results are shown below in Table 3.

TABLE 3

| | E1* | E2 | E4 | E5 | E9* | E11 | E12 |
|---|---|---|---|---|---|---|---|
| 1% Strain Jig; 65° C., 72 hours | No Crack | No Crack | No Crack | No Crack | No Crack | No Crack | Crack |

*Comparative

As seen in Table 3, each of inventive Examples 2, 4, 5, and 11 exhibited similar chemical resistance to the sunscreen relative to the control composition of Example 1, where no cracks were observed.

Overall, the test results shown in Tables 2 and 3 indicate good processability and performance balance by introducing ABS or SAN into the compositions, while retaining good chemical resistance. The inventive compositions including an acrylonitrile-styrene flow promoter represent promising candidates to meet the industry requirements for applications in consumer electronic devices.

The compositions, methods, and articles are further illustrated by the following embodiments.

Embodiment 1

A thermoplastic composition, comprising 10 to 30 wt % of a poly(etherimide); 5 to 15 wt % of a poly(ester-carbonate); 30 to 55 wt % of a poly(carbonate-siloxane); 5 to 25 wt % of a flow promoter comprising units derived from styrene and acrylonitrile, preferably an acrylonitrile-butadiene-styrene, a styrene-acrylonitrile, a high rubber graft acrylonitrile-styrene-acrylate copolymer, or a combination comprising at least one of the foregoing; and 1 to 5 wt % of a hydrogenated block copolymer of an alkenyl aromatic compound and a conjugated diene; wherein the weight percent of each component is based on the total weight of the composition.

Embodiment 2

The composition of embodiment 1, wherein a molded sample of the thermoplastic composition exhibits one or more of: a tensile modulus of greater than or equal to 2000 MPa, preferably 2000 to 2500 MPa, determined according to ASTM D638; a melt volume-flow rate of greater than or equal to 40 cm³/10 minutes, preferably 40 to 100 cm³/10 minutes, more preferably 50 to 80 cm³/10 minutes, determined according to ASTM D1238 at 295° C. under a 6.7 kilogram load; a notched Izod impact strength of greater than or equal to 100 J/m, preferably 150 to 850 J/m, more preferably 200 to 650 J/m, determined according to ASTM D256 at 23° C. using a 5 lb-f hammer on 75×12.5×3.2 millimeter injection molded bars; and a heat deflection temperature of greater than or equal to 100° C., preferably 105 to 125° C., more preferably 105 to 115° C., determined according to ASTM D648.

Embodiment 3

The composition of embodiment 1 or 2, wherein a molded sample of the thermoplastic composition does not exhibit cracking during tensile testing at 1% strain after being immersed in a chemical reagent comprising sunscreen for a period of 72 hours at a temperature of 65° C. or for a period of 120 hours at a temperature of 23° C.

Embodiment 4

The composition of any one or more of embodiments 1 to 3, wherein the poly(etherimide) comprises units of the formula wherein each R is independently a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

Embodiment 5

The composition of embodiment 4, wherein each R is independently a divalent group of the formula wherein $Q^1$ is —O—, —S—, —C(O)—, —SO₂—, —SO—, —P(R$^a$)(=O)— wherein R$^a$ is a $C_{1-8}$ alkyl or $C_{6-12}$ aryl, —C$_y$H$_{2y}$— or a halogenated derivative thereof wherein y is an integer from 1 to 5, or —(C₆H₁₀)$_z$— wherein z is an integer from 1 to 4; and Z is a group of the formula wherein $R^a$ and $R^b$ are each independently a halogen atom or a monovalent $C_{1-6}$ alkyl group, p and q are each independently integers of 0 to 4, c is 0 to 4, and $X^a$ is a single bond, —O—, —S—, —S(O)—, —SO$_2$—, —C(O)—, or a $C_{1-18}$ organic bridging group; preferably wherein each R is independently meta-phenylene, para-phenylene, bis(4,4'-phenylene)sulfonyl, or a combination comprising at least one of the foregoing, and each Z is 4,4'-diphenylene isopropylidene.

Embodiment 6

The composition of any one or more of embodiments 1 to 5, wherein the poly(ester-carbonate) is a poly(ester-carbonate-siloxane), preferably a poly(ester-carbonate-siloxane) comprising bisphenol A carbonate units, isophthalate-terephthalate-bisphenol A ester units, and siloxane units, more preferably blocks containing 5 to 200 dimethylsiloxane units.

Embodiment 7

The composition of any one or more of embodiments 1 to 6, wherein the poly(carbonate-siloxane) is transparent, and comprises bisphenol A carbonate units and less than 10 wt % siloxane units, based on the total weight of the poly(carbonate-siloxane).

Embodiment 8

The composition of any one or more of embodiments 1 to 7, wherein the flow promoter comprises an acrylonitrile-butadiene-styrene graft copolymer.

Embodiment 9

The composition of any one or more of embodiments 1 to 7, wherein the flow promoter comprises a styrene-acrylonitrile copolymer.

Embodiment 10

The composition of embodiment 9, wherein the flow promoter further comprises a high rubber graft acrylonitrile-styrene-butyl acrylate copolymer.

Embodiment 11

The composition of any one or more of embodiments 1 to 10, wherein the hydrogenated block copolymer comprises a poly(styrene-(ethylene-butylene)-styrene) triblock copolymer having an Mw of 10,000 to 100,000 Da.

Embodiment 12

The composition of embodiment 11, wherein the poly(styrene-(ethylene-butylene)-styrene) triblock copolymer has a polystyrene content of 40 to 70 wt %.

Embodiment 13

The composition of any one or more of embodiments 1 to 12, wherein the composition further comprises 5 to 12 wt % of an impact modifier, preferably wherein the impact modifier is an acrylic core-shell impact modifier.

Embodiment 14

The composition of any one or more of embodiments 1 to 13, wherein the composition further comprises an additive composition comprising a filler, reinforcing agent, antioxidant, heat stabilizer, light stabilizer, ultraviolet light stabilizer, ultraviolet light absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing.

Embodiment 15

The thermoplastic composition of embodiment 1, comprising 15 to 21 wt % of a poly(etherimide); 8 to 12 wt % of a poly(ester-carbonate-siloxane); 35 to 50 wt % of a transparent poly(carbonate-siloxane) comprising less than 10 wt % siloxane units, based on the total weight of the poly(carbonate-siloxane); 10 to 20 wt % of an acrylonitrile-butadiene-styrene graft copolymer, a styrene-acrylonitrile copolymer, or a combination comprising at least one of the foregoing; and 2.5 to 3.5 wt % of a poly(styrene-(ethylene-butylene)-styrene) triblock copolymer; wherein the weight percent of each component is based on the total weight of the composition; and wherein a molded sample of the thermoplastic composition exhibits one or more of: a tensile modulus of greater than or equal to 2000 MPa, preferably 2000 to 2500 MPa, determined according to ASTM D638; a melt volume-flow rate of greater than or equal to 40 cm$^3$/10 minutes, preferably 40 to 100 cm$^3$/10 minutes, more preferably 50 to 80 cm$^3$/10 minutes, determined according to ASTM D1238 at 295° C. under a 6.7 kilogram load; a notched Izod impact strength of greater than or equal to 100 J/m, preferably 150 to 850 J/m, more preferably 200 to 650 J/m, determined according to ASTM D256 at 23° C. using a 5 lb-f hammer on 75×12.5×3.2 millimeter injection molded bars; and a heat deflection temperature of greater than or equal to 100° C., preferably 105 to 125° C., more preferably 105 to 115° C., determined according to ASTM D648.

Embodiment 16

The composition of embodiment 15, further comprising 5 to 10 wt % of an impact modifier; and 5 to 15 wt % of an additive composition.

Embodiment 17

A method of making the thermoplastic composition of any one or more of embodiments 1 to 16, the method comprising, melt-mixing the components of the composition; and optionally, extruding the composition.

Embodiment 18

An article comprising the thermoplastic composition of any one or more of embodiments 1 to 16, or a thermoplastic composition made by the method of embodiment 17.

Embodiment 19

The article of embodiment 18, wherein the article is an electronic device or a component of an electronic device.

Embodiment 20

The article of embodiment 18 or 19, wherein the electronic device is an antenna, an antenna housing, a computer, a monitor, a hand-held electronic device, or a cellular telephone.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or propylene (—(CH$_2$)$_3$—)). "Cycloalkylene" means a divalent cyclic alkylene group, —C$_n$H$_{2n-2x}$—, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)athiol (—SH), a thiocyano (—SCN), a tosyl (CH$_3$C$_6$H$_4$SO$_2$—), a C$_{3-12}$ cycloalkyl, a C$_2$-12 alkenyl, a C$_5$-12 cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermoplastic composition, comprising
   10 to 30 wt % of a poly(etherimide);
   5 to 15 wt % of a poly(ester-carbonate);
   30 to 55 wt % of a poly(carbonate-siloxane);
   5 to 25 wt % of a flow promoter comprising units derived from styrene and acrylonitrile; and
   1 to 5 wt % of a hydrogenated block copolymer of an alkenyl aromatic compound and a conjugated diene, wherein the hydrogenated block copolymer comprises a ply(styrene-(ethylene-butylene)-styrene) triblock copolymer having a weight average molecular weight of 10,000 to 100,000 grams per mole;
   wherein the weight percent of each component is based on the total weight of the composition.

2. The composition of claim 1, wherein a molded sample of the thermoplastic composition exhibits one or more of:
   a tensile modulus of greater than or equal to 2000 MPa, determined according to ASTM D638;
   a melt volume-flow rate of greater than or equal to 40 cm$^3$/10 minutes, determined according to ASTM D1238 at 295° C. under a 6.7 kilogram load;
   a notched Izod impact strength of greater than or equal to 100 J/m, determined according to ASTM D256 at 23° C. using a 5 lb-f hammer on 75×12.5×3.2 millimeter injection molded bars; and
   a heat deflection temperature of greater than or equal to 100° C., determined according to ASTM D648.

3. The composition of claim 1, wherein a molded sample of the thermoplastic composition does not exhibit cracking during tensile testing at 1% strain after being immersed in a chemical reagent comprising sunscreen for a period of 72 hours at a temperature of 65° C. or for a period of 120 hours at a temperature of 23° C.

4. The composition of claim 1, wherein the poly(etherimide) comprises units of the formula wherein
each R is independently a substituted or unsubstituted $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing; and
each Z is independently an aromatic $C_{6-24}$ monocyclic or polycyclic group optionally substituted with 1 to 6 $C_{1-8}$ alkyl groups, 1 to 8 halogen atoms, or a combination comprising at least one of the foregoing.

5. The composition of claim 4, wherein each R is independently a divalent group of the formula wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— or a halogenated derivative thereof wherein y is an integer from 1 to 5, or —(C$_6$H$_{10}$)z— wherein z is an integer from 1 to 4; and
Z is a group of the formula wherein
R$^a$ and R$^b$ are each independently a halogen atom or a monovalent $C_{1-6}$ alkyl group,
p and q are each independently integers of 0 to 4,
c is 0 to 4, and
X$^a$ is a single bond, —O—, —S—, —S(O)—, —SO$_2$—, —C(O)—, or a $C_{1-18}$ organic bridging group.

6. The composition of claim 1, wherein the poly(ester-carbonate) is a poly(ester-carbonate-siloxane).

7. The composition of claim 1, wherein the poly(carbonate-siloxane) is transparent, and comprises bisphenol A carbonate units and less than 10 wt % siloxane units, based on the total weight of the poly(carbonate-siloxane).

8. The composition of claim 1, wherein the flow promoter comprises an acrylonitrile-butadiene-styrene graft copolymer.

9. The composition of claim 1, wherein the flow promoter comprises a styrene-acrylonitrile copolymer.

10. The composition of claim 9, wherein the flow promoter further comprises a high rubber graft acrylonitrile-styrene-butyl acrylate copolymer.

11. The composition of claim 1, wherein the poly (styrene-(ethylene-butylene)-styrene) triblock copolymer has a polystyrene content of 40 to 70 wt %.

12. The composition of claim 1, wherein the composition further comprises 5 to 12 wt % of an impact modifier.

13. The composition of claim 1, wherein the composition further comprises an additive composition comprising a filler, reinforcing agent, antioxidant, heat stabilizer, light stabilizer, ultraviolet light stabilizer, ultraviolet light absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing.

14. The thermoplastic composition of claim 1, comprising
15 to 21 wt % of a poly(etherimide);
8 to 12 wt % of a poly(ester-carbonate-siloxane);
35 to 50 wt % of a transparent poly(carbonate-siloxane) comprising less than 10 wt % siloxane units, based on the total weight of the poly(carbonate-siloxane);
10 to 20 wt % of an acrylonitrile-butadiene-styrene graft copolymer, a styrene-acrylonitrile copolymer, or a combination comprising at least one of the foregoing; and 2.5 to 3.5 wt % of the hydrogenated block copolymer comprising poly(styrene-(ethylene-butylene)-styrene) triblock copolymer;

wherein the weight percent of each component is based on the total weight of the composition; and wherein a molded sample of the thermoplastic composition exhibits one or more of:

a tensile modulus of greater than or equal to 2000 MPa, determined according to ASTM D638;

a melt volume-flow rate of greater than or equal to 40 cm$^3$/10 minutes, determined according to ASTM D1238 at 295° C. under a 6.7 kilogram load;

a notched Izod impact strength of greater than or equal to 100 J/m, determined according to ASTM D256 at 23° C. using a 5 lb-f hammer on 75×12.5×3.2 millimeter injection molded bars; and a heat deflection temperature of greater than or equal to 100° C., determined according to ASTM D648.

15. The composition of claim 14, further comprising 5 to 10 wt % of an impact modifier; and 5 to 15 wt % of an additive composition.

16. A method of making the thermoplastic composition of claim 1, the method comprising, melt-mixing the components of the composition; and optionally, extruding the composition.

17. An article comprising the thermoplastic composition of claim 1.

18. The article of claim 17, wherein the article is an electronic device or a component of an electronic device.

19. The article of claim 17, wherein the electronic device is an antenna, an antenna housing, a computer, a monitor, a hand-held electronic device, or a cellular telephone.

* * * * *